(12) United States Patent
Dennis et al.

(10) Patent No.: US 11,327,641 B1
(45) Date of Patent: *May 10, 2022

(54) DATA COLLABORATION BETWEEN DIFFERENT ENTITIES

(71) Applicant: Palantir Technologies Inc., Palo Alto, CA (US)

(72) Inventors: Graham Dennis, Downer (AU); Timothy Taylor, Wellington (NZ); Kimberley Lear, Washington, DC (US); Jesse Rickard, Kingston (AU); Dyon Balding, New York, NY (US); Hunter Pitelka, Arlington, VA (US); David Leblanc, Ottawa (CA); Vaughan Shanks, Dickson (AU); Joel Davies, Canberra (AU); Steffen Merten, Lower Hutt (NZ); Christopher Cook, Wellington (NZ); Christopher Male, Wellington (NZ); Marc Barker, New Acton (AU)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,010

(22) Filed: Feb. 25, 2019

Related U.S. Application Data

(63) Continuation of application No. 15/856,989, filed on Dec. 28, 2017, now Pat. No. 10,222,965, which is a
(Continued)

(51) Int. Cl.
*G06F 3/0484* (2013.01)
*G06T 11/20* (2006.01)
(Continued)

(52) U.S. Cl.
CPC ........ *G06F 3/04847* (2013.01); *G06T 11/206* (2013.01); *G06T 11/60* (2013.01);
(Continued)

(58) Field of Classification Search
CPC .... G06F 3/04847; G06T 11/206; G06T 11/60; G06T 2200/24; H04L 67/10; H04L 67/06
See application file for complete search history.

(56) References Cited

U.S. PATENT DOCUMENTS

| | | | |
|---|---|---|---|
| 6,643,613 | B2 | 11/2003 | McGee et al. |
| 7,028,223 | B1 | 4/2006 | Kolawa et al. |
| | | (Continued) | |

OTHER PUBLICATIONS

Official Communication in New Zealand Application No. 627962 dated Aug. 5, 2014.
(Continued)

*Primary Examiner* — John T Repsher, III
(74) *Attorney, Agent, or Firm* — Hickman Becker Bingham Ledesma LLP

(57) ABSTRACT

Techniques related to data collaboration between different entities are disclosed. In an embodiment, a graph may be displayed in a computer graphical user interface. The graph may include nodes and edges. Each node may represent a distinct data object. Each edge may represent one or more relationships between the two distinct data objects. Based on one or more redaction criteria, a portion of the graph may be identified to be redacted before the graph is exported. Display of the graph in the computer graphical user interface may be updated to remove display of the portion of the graph. After the updating, a request to export the graph may be received. Responsive to receiving the request, a machine-readable representation of a redacted graph may be exported.

15 Claims, 22 Drawing Sheets

Related U.S. Application Data continuation of application No. 14/887,071, filed on Oct. 19, 2015, now Pat. No. 9,857,960.

(60) Provisional application No. 62/209,762, filed on Aug. 25, 2015.

(51) Int. Cl.

| | | |
|---|---|---|
| *G06T 11/60* | (2006.01) | |
| *H04L 29/08* | (2006.01) | |
| *G06F 3/04847* | (2022.01) | |
| *H04L 67/06* | (2022.01) | |
| *H04L 67/10* | (2022.01) | |

(52) U.S. Cl.
CPC .............. *H04L 67/06* (2013.01); *H04L 67/10* (2013.01); *G06T 2200/24* (2013.01)

(56) References Cited

U.S. PATENT DOCUMENTS

| | | | |
|---|---|---|---|
| 8,799,867 B1 | 8/2014 | Peri-Glass et al. | |
| 9,223,773 B2 | 12/2015 | Isaacson | |
| 9,857,960 B1 | 1/2018 | Dennis et al. | |
| 2004/0153837 A1 | 8/2004 | Preston et al. | |
| 2005/0251786 A1 | 11/2005 | Citron et al. | |
| 2006/0053170 A1* | 3/2006 | Hill ........................ | G06F 16/358 |
| 2006/0129992 A1 | 6/2006 | Oberholtzer et al. | |
| 2009/0199047 A1 | 8/2009 | Vaitheeswaran et al. | |
| 2009/0319418 A1 | 12/2009 | Herz | |
| 2010/0010912 A1* | 1/2010 | Jones ..................... | G06Q 30/06 |
| | | | 705/26.1 |
| 2010/0079461 A1* | 4/2010 | Breeds .................. | G06T 11/206 |
| | | | 345/440 |
| 2013/0024731 A1 | 1/2013 | Shochat et al. | |
| 2013/0117802 A1 | 5/2013 | Fendt | |
| 2013/0251233 A1 | 9/2013 | Yang et al. | |
| 2014/0129936 A1* | 5/2014 | Richards ............. | G06F 21/6218 |
| | | | 715/716 |
| 2014/0268244 A1* | 9/2014 | Sheridan ................ | G06Q 10/10 |
| | | | 358/403 |
| 2014/0317104 A1* | 10/2014 | Isaacs ................... | G06F 16/332 |
| | | | 707/728 |
| 2015/0074050 A1 | 3/2015 | Landau et al. | |
| 2015/0112641 A1 | 4/2015 | Faraj | |
| 2015/0161406 A1 | 6/2015 | Fox et al. | |
| 2015/0186653 A1* | 7/2015 | Gkoulalas-Divanis ..................... | |
| | | | G06F 21/60 |
| | | | 726/26 |

OTHER PUBLICATIONS

Official Communication for Great Britain Patent Application No. 1413935.6 dated Dec. 21, 2015.

U.S. Appl. No. 14/887,229, filed Oct. 7, 2015, Office Action, dated Mar. 22, 2016.

U.S. Appl. No. 14/887,071, filed Oct. 19, 2015, Final Office Action, dated Sep. 8, 2016.

U.S. Appl. No. 14/887,071, filed Oct. 19, 2015, First Office Action Interview, dated May 17, 2016.

U.S. Appl. No. 14/887,071, filed Oct. 19, 2015, Office Action, dated Mar. 21, 2016.

U.S. Appl. No. 14/887,071, filed Oct. 19, 2015, Notice of Allowance, dated Aug. 28, 2017.

U.S. Appl. No. 15/856,989, filed Dec. 28, 2017, First office Action Interview, dated Apr. 2, 2018.

U.S. Appl. No. 15/856,989, filed Dec. 28, 2017, First office Action Interview, dated Jun. 13, 2018.

U.S. Appl. No. 15/856,989, filed Dec. 28, 2017, Notice of Allowance, dated Nov. 2, 2018.

\* cited by examiner

FIG. 3

| REDACTION STAGE 300 | REDACTION CRITERIA 302 | PORTION OF GRAPH TO BE REDACTED 304 |
|---|---|---|
| 1 | ACCESS CONTROL CLASSIFICATION 306 | DISTINCT DATA OBJECT 212 |
| 2 | PROVENANCE 308 | RELATIONSHIP 220 |
| 3 | DATA OBJECT TYPE 310 | DISTINCT DATA OBJECTS 206 - 210 |
| 4 | DATA OBJECT PROPERTY TYPE 312 | DATA OBJECT PROPERTY 216 |
| 5 | MEDIA TYPE 314 | DATA OBJECT PROPERTY 214 |

| ☐ Palantir Data Importer (Automatic Guessing Disabled by an Administrator) | _ ☐ ☒ |
|---|---|

Automatic guessing of object and property types has been disabled by an administrator.

Step 3 - Review Your Import         SOURCE   MAP   REVIEW
                                          ○———○———◎

Review a summary of your import, then configure data permissions and object resolution settings.

1. Review these summary statistics for your import.

Palantir XML

| | Data Source Count | Kilobytes of Data |
|---|---|---|
| Palantir XML | ▨(1) | ▨(97) |

2. Set user access permissions on the data you're importing.

Using default classification. MS//REL TO USA, FVEY

Edit Permissions/Discovery Message  The importer is currently configured to use default permissions.

3. Choose an object resolution setting.

◉ *None (Recommended)*: Don't perform object resolution on my imported data.
○ *Manual Resolution*: Resolve selected objects manually.
○ *Record Resolution*: Save a set of resolution rules for repeated use.
○ *Load*: Use preexisting resolution criteria from an Object Resolution Suite.
   [ ▽ ]

[Learn more]                                    [Cancel] [Back] [Import] [Save & Import...]

FIG. 9B

DATA COLLABORATION BETWEEN DIFFERENT ENTITIES

CROSS REFERENCE TO RELATED APPLICATIONS; PRIORITY CLAIM

This application claims the benefit under 35 U.S.C. 120 as a continuation of application Ser. No. 15/856,989, filed Dec. 28, 2017, which is a continuation of application Ser. No. 14/887,071, filed Oct. 19, 2015, which claims the benefit of provisional application 62/209,762, filed Aug. 25, 2015, the entire contents of each of which is hereby incorporated by reference as if fully set forth herein, under 35 U.S.C. § 119(e).

FIELD OF THE DISCLOSURE

Embodiments relate to data sharing and more specifically, to data collaboration between different entities.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Different entities may include governments, corporations, and/or individuals who wish to participate in data collaboration. However, there may be some information that an entity may wish to share with a different entity, and there may be other information that the entity may wish to avoid sharing with the different entity. Unfortunately, it may be difficult to establish categorical rules for distinguishing between information to share and information to safeguard. For example, the intricacies of complex internal policies may carve out exceptions that swallow up a general rule. Thus, there is a need for an approach that facilitates consistent application of such distinctions at fine levels of granularity.

BRIEF DESCRIPTION OF THE DRAWINGS

In the drawings:

FIG. 3 is a table that depicts an approach for identifying portions of a graph to be redacted.

FIGS. 9A-G depict example computer graphical user interfaces for an import process.

Figure 1:
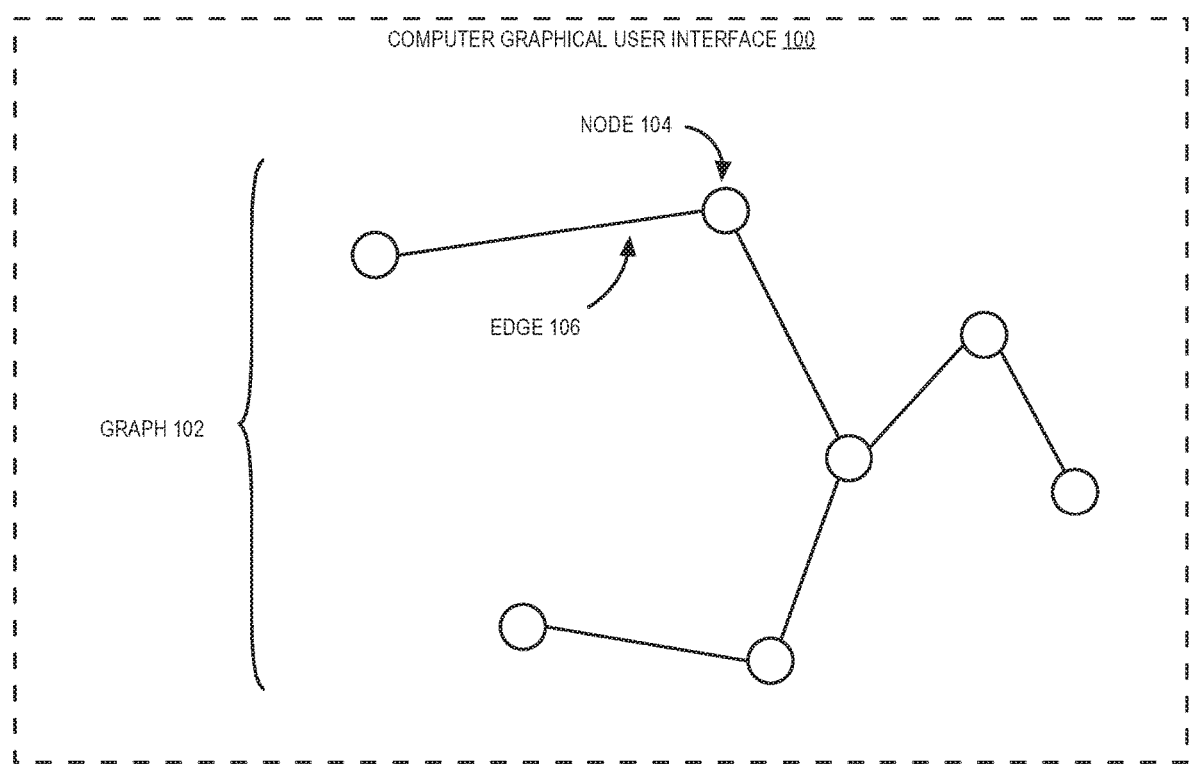
FIG. 1 depicts an example graph.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order. For example, a second data object may be so named although, in reality, it may correspond to a first, second, and/or third data object.

GENERAL OVERVIEW

Different entities may wish to share information. For example, Alice may wish to send information about Bob to Charlie. A graphical representation of the information about Bob may be displayed at Alice's computer. The graphical representation may include nodes and edges. Each node may represent a person, place, event, or anything else that can be a noun. Each node may also be associated with an attribute, such as hair color, address, birthdate, etc. Each edge may connect two nodes and may represent a relationship between the two nodes.

The information about Bob may undergo one or more redaction stages. In each redaction stage, Alice may identify a portion of the graphical representation to be redacted based on any of a number of redaction criteria. In each redaction stage, display of the graphical representation may be updated to remove display of the portion of the graphical representation to be redacted.

After the last redaction stage, Alice may submit a request to export the graphical representation. In an embodiment, the request may cause audit data to be generated and sent to a person with the authority to approve exporting the graphical representation. For example, the audit data may be provided to Diana for approval. When Alice and/or Diana confirm exporting the graphical representation, a machine-readable representation of a redacted graph is exported to Charlie.

When Charlie imports the machine-readable representation, the redacted graph may be displayed at Charlie's computer. In an embodiment, Alice's information about Bob may be resolved with Charlie's information about Bob.

Example Graph

An entity (e.g., a government, a corporation, an organization, an individual) may wish to share information with a different entity. The information may be stored as a graph that is displayed at a computer associated with the entity. FIG. 1 depicts an example graph. Referring to FIG. 1, Graph 102 is displayed in computer graphical user interface 100. Graph 102 includes node 104 and edge 106.

Graph 102 may be conceptually structured according to an object-centric data model. The object-centric data model may be independent of any particular database model that may be used for storing a copy of the information to be shared. For example, each data object of the object-centric data model may correspond to one or more rows in a relational database or an entry in a Lightweight Directory Access Protocol (LDAP) database.

Graph 102 may include multiple nodes. Each node 104 of the multiple nodes may represent a distinct data object. At the highest level of abstraction, a data object may be a container for information representing things in the world. For example, a data object may represent a person, a place, an organization, an event, a document, an unstructured data source (e.g., an e-mail, a news report, an academic paper), or other noun. Each data object may be associated with a unique identifier that uniquely identifies the data object. Additionally or alternatively, each data object may be associated with a data object type (e.g., a person, an event, a document). Additionally or alternatively, each data object may be associated with a display name, which may be the value of a particular property of the data object.

Figure 2:
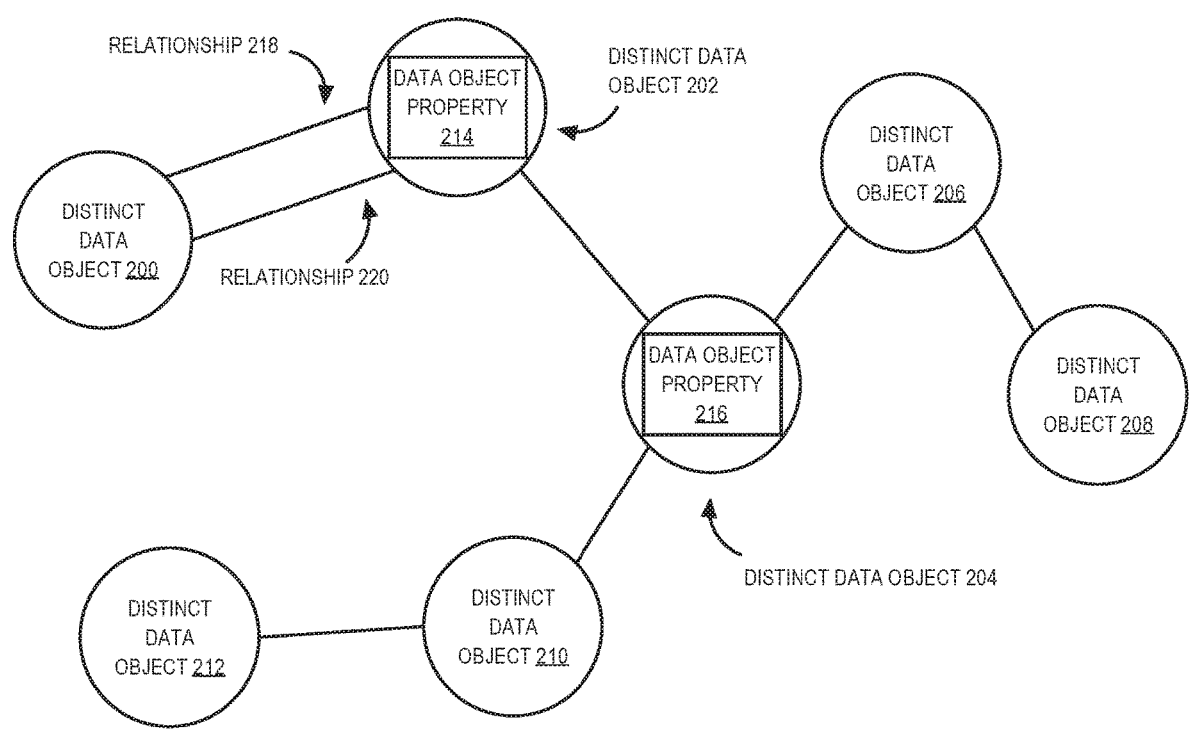
FIG. 2 depicts a detailed view of a graph, in an example embodiment.

FIG. 2 depicts a detailed view of a graph, in an example embodiment. Referring to FIG. 2, graph 102 includes distinct data objects 200, 202, 204, 206, 208, 210, and 212. Distinct data objects 200 and 202 are connected by relationships 218 and 220. Distinct data object 202 contains data object property 214, and distinct data object 204 contains data object property 216.

Each data object may be a container for one or more data object properties 214, 216. Data object properties 214, 216 may be attributes of data objects and may represent individual data items. Each data object property 214, 216 may have a type and a value. Different data object types may be associated with different data object property types. For example, the data object type "person" may have the data object property type "eye color", whereas the data object type "event" may have the data object property type "date". Additionally or alternatively, a data object may contain more than one data object property 214, 216 of the same type. For example, the data object type "person" may have more than one of the data object property type "phone number".

Graph 102 may include at least one edge 106 that connects two nodes. Each edge 106 may represent one or more relationships 218, 220 between the two nodes. In the example of FIG. 2, each of relationships 218 and 220 represents a respective connection between two distinct data objects 200 and 202. For example, distinct data objects 200 and 202 may share a common event or matching data object property values. Each of relationships 218 and 220 may be symmetrical or asymmetrical. For example, distinct data object 200 may be connected to distinct data object 202 by an asymmetric "child of" relationship or a symmetric "kin of" relationship.

Different data object types may be associated with different relationship types. For example, relationship 218 may be a "lives with" relationship if distinct data objects 200 and 202 are both of the data object type "person" and share matching data object property values for the data object property type "address". In another example, distinct data objects 200 and 204 may be separated by distinct data object 200, which is of the data object type "event". Thus, distinct data objects 200 and 204 may be connected to distinct data object 200 by a "participated in" relationship.

In an embodiment, edge 106 of FIG. 1 may represent both relationships 218 and 220 of FIG. 2. Thus, a pair of distinct data objects 200, 202 may be connected by multiple relationships 218 and 220. For example, distinct data objects 200 and 202 may each be of the data object type "person", relationship 218 may represent a "spouse of" relationship, and relationship 220 may represent a "lives with" relationship.

Data object types, data object property types, and/or relationship types may be defined according to a pre-defined or user-defined ontology or other hierarchical organization of data object types and data object property types. These definitions may be stored as a portable ontology map that may be transmitted between different entities.

Approach for Identifying Portions of a Graph to be Redacted

An entity may wish to redact a particular data object, a particular data object property, and/or a particular relationship that is displayed in computer graphical user interface 100. FIG. 3 is a table that depicts an approach for identifying portions of a graph to be redacted. Referring to FIG. 3, each redaction stage 300 corresponds to one or more redaction criteria 302 and a portion of the graph to be redacted 304. Redaction criteria 302 includes access control classification 306, provenance 308, data object type 310, data object property type 312, and media type 314.

Computer graphical user interface 100 may be used to identify one or more portions of a graph 102 to be redacted by the time the graph 102 is exported. Identifying one or more portions of a graph 102 to be redacted may be performed in one or more redaction stages 300 by a user and/or an automated computing process.

One or more redaction criteria 302 may be used in each redaction stage 300. The one or more redaction criteria 302 may be applied in any order and in any combination. The one or more redaction criteria 302 may be any of a number of different categories for data. In an embodiment, a server computer communicatively coupled to computer graphical user interface 100 may store the different categories for data. Thus, computer graphical user interface 100 may receive input from a user selecting the one or more redaction criteria 302 from available categories. Additionally or alternatively, the one or more redaction criteria 302 may be automatically detected based on graph metadata, such as access control identifiers, provenance identifiers, data object identifiers, etc.

In an embodiment, a redacted graph may be generated based on filtering portions of a graph 102 in a series of redaction stages 300. The series of redaction stages 300 may be ordered in such a manner that each successive redaction stage 300 filters portions of the graph 102 at an increasingly finer level of granularity. For example, in FIG. 3, the series of redaction stages 300 may be designed so that redaction criteria 302 progress from broad categories to specific sub-categories.

In a first redaction stage 300, a first portion of graph 102 to be redacted may be identified based on an access control classification 306 of the first portion of graph 102. Access control classification 306 may include a permission based on a security clearance, a user's responsibilities within an entity, an identity of a receiving entity, and/or any other suitable basis for establishing bright-line rules for data access. Each data item in graph 102 may be associated with one or more access control classifications 306. For example, in FIG. 3, distinct data object 212 may correspond to an informant who is identified for redaction based on an access control classification 306 indicating that information related to the informant should generally be safeguarded from a particular receiving entity, such as the government of Canada.

In a second redaction stage 300 of FIG. 3, a second portion of graph 102 to be redacted may be identified based on a provenance 308 of the second portion of graph 102. Provenance 308 may indicate a particular information source, such as a particular entity, a particular database, and/or a particular document. Each data item in graph 102 may be associated with a provenance identifier. For example, in FIG. 3, relationship 220 may correspond to information that was obtained from a particular government agency, such as the National Security Agency, and that is identified to be redacted by the time graph 102 is exported.

In a third redaction stage 300 of FIG. 3, a third portion of graph 102 to be redacted may be identified based on a data object type 310 of the third portion of graph 102. Each distinct data object of graph 102 may contain an identification of a data object type 310. For example, in FIG. 3, distinct data objects 206, 208, and 210 may correspond to documents that are identified for redaction so that the existence of the documents remains unknown to other entities.

In a fourth redaction stage 300 of FIG. 3, a fourth portion of graph 102 to be redacted may be identified based on a data object property type 312 of the fourth portion of graph 102. Each data object property in graph 102 may be associated with an identification of a data object property type 312. For example, in FIG. 3, data object property 216 may correspond to salary information that is identified to be redacted by the time graph 102 is exported.

In a fifth redaction stage 300 of FIG. 3, a fifth portion of graph 102 to be redacted may be identified based on a media type 314 of the fifth portion of graph 102. Media type 314 may indicate a particular data type or file format, such as an application, an audio recording, a video recording, an image, a message, and/or text. Each distinct data object of graph 102 that contains media data may also contain an identification of a media type 314. For example, in FIG. 3, data object property 214 may correspond to a photograph that is identified to be redacted by the time graph 102 is exported.

Although redaction criteria 302 and redaction stages 300 are depicted in FIG. 3 as having a particular order, the particular order is provided by way of example and should not be construed as limiting redaction criteria 302 and redaction stages 300 in any way. Redaction criteria 302 and redaction stages 300 may be applied in any order and in any combination, including an order and/or combination that differs depending on the particular graph 102 to be redacted.

Example Redacted Graph

Figure 4:
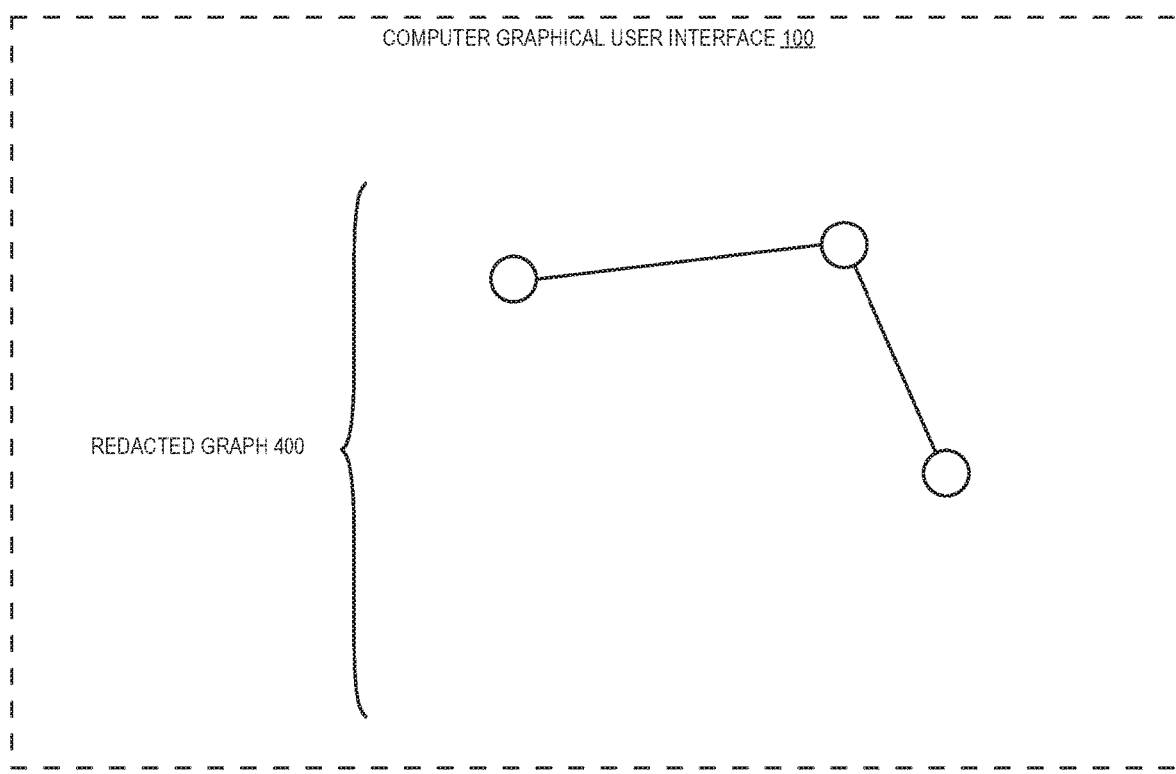
FIG. 4 depicts an example redacted graph.

At the same time or after a time when one or more portions of a graph 102 are identified to be redacted, display of the graph 102 may be updated to remove display of the one or more portions of the graph 102 that were identified. A redacted graph may be the graph 102 exclusive of the one or more portions of the graph 102 that are identified to be redacted. FIG. 4 depicts an example redacted graph. Referring to FIG. 4, redacted graph 400 is displayed in computer graphical user interface 100.

A redacted graph 400 may be displayed concurrently with or subsequent to identifying one or more portions of a graph to be redacted. For example, a redacted graph 400 may be displayed in each redaction stage 300. Additionally or alternatively, a redacted graph 400 may be displayed after a final redaction stage 300. Additionally or alternatively, a redacted graph 400 may be displayed whenever one or more portions of the graph 102 are to be removed.

Displaying a redacted graph 400 may provide a user with feedback regarding one or more redactions. By providing the user with a graphical representation of the effects of one or more redactions, undesired redactions may be avoided. For example, a user may be unaware that redacting both distinct data objects 200 and 202 may cause automatic redaction of relationships 218 and 220. Thus, displaying a redacted graph 400 may serve as a mechanism for obtaining user confirmation of one or more redactions.

Example Set of Export Data

Figure 5:
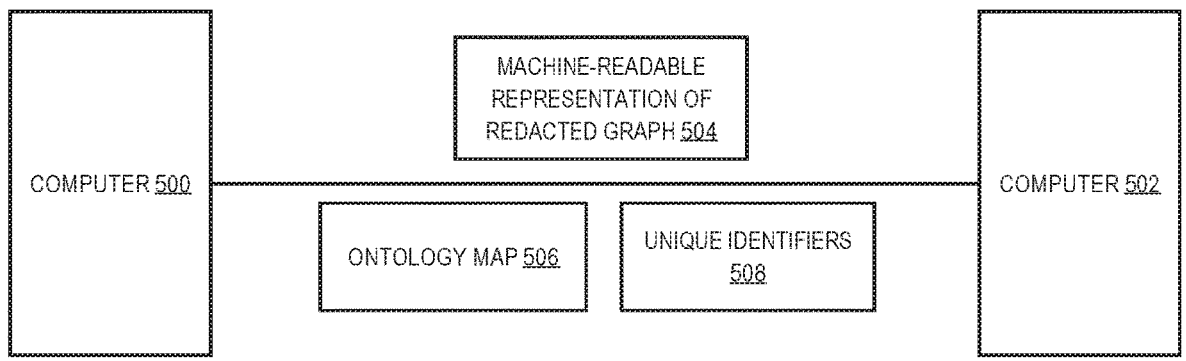
FIG. 5 depicts an example set of export data.

After any remaining redaction stages 300 are complete, a request to export the graph 102 may be received as input via a computer graphical user interface 100. For example, after updating the display of graph 102 in computer graphical user interface 100, a set of export data may be generated. FIG. 5 depicts an example set of export data. Referring to FIG. 5, computer 500 is communicatively coupled to computer 502. Machine-readable representation of redacted graph 504, ontology map 506, and unique identifiers 508 are transmitted between computers 500 and 502.

Each of computers 500 and 502 may be one or more physical computers, virtual computers, and/or computing devices. As an example, each of computers 500 and 502 may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Each of computers 500 and 502 may be a client and/or a server.

A set of export data may include one or more files from which a redacted graph may be re-constructed at a computer 500, 502 associated with a receiving entity. A set of export data may include a machine-readable representation of redacted graph 504, an ontology map 506, unique identifiers 508, and/or any other information that may be stored as graph metadata.

Machine-readable representation of redacted graph 504 may include graph state information. The graph state information may be encoded and/or compressed in any of a number of formats. For example, the graph state information may be a binary-encoded serialization of a tree or other hierarchical data structure. Additionally or alternatively, machine-readable representation of redacted graph 504 may include the scalar data represented in the redacted graph. For example, the scalar data may be stored as an Extensible Markup Language (XML) file, a JavaScript Object Notation (JSON) file, and/or any other serializable hierarchy of data.

As mentioned above, ontology map 506 may define interrelationships among various portions of the redacted graph. The interrelationships may include one or more operations that may be performed on a particular portion of the redacted graph 400. Ontology map 506 may be stored as an XML file, a JSON file, and/or any other suitable format for storing hierarchical data.

Unique identifiers 508 may uniquely identify access control classifications 306, provenance 308, data objects, data object properties, relationships, media files, and/or any other portion of a graph 102. For example, a respective unique identifier may be associated with each distinct data object in a redacted graph. Unique identifiers 508 may be used to correlate graph state information to scalar data. Unique identifiers 508 that are globally unique may support data object resolution and/or data deconfliction, which will be described in greater detail below.

In an embodiment, a set of export data may include graph metadata, such as vector clocks, timestamps, a list of included data object types, a list of included data object property types, a list of included relationship types, and/or any other information that may facilitate importing a redacted graph by a receiving entity. For example, as will be described in greater detail below, the graph metadata may indicate which portions of a redacted graph 400 were included in a previous transmission.

In an embodiment, a request to export a graph 102 may cause audit data to be generated. The audit data may include a log of changes made to a graph 102. For example, the audit data may indicate which data was changed (e.g., added, modified, deleted), when the data was changed, who made the change, where the data came from, and/or why the data was changed. In response to receiving the request to export the graph 102, computer 500, 502 may automatically generate and provide the audit data to a person authorized to approve sending a set of export data to a receiving entity.

Process Overview

Figure 6:
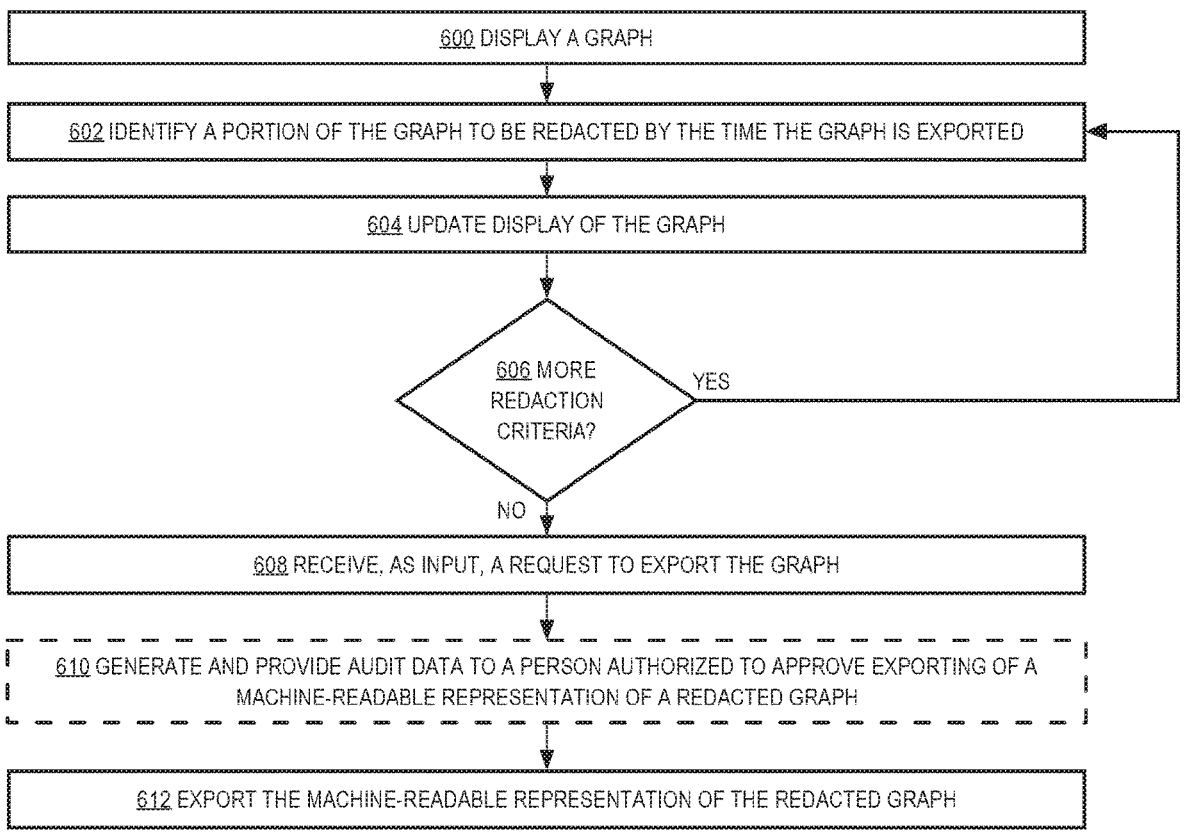
FIG. 6 is a flow diagram that depicts an approach for data collaboration between different entities.

FIG. 6 is a flow diagram that depicts an approach for data collaboration between different entities. The data collaboration may involve transmitting a redacted graph 400 between computers 500, 502 of different entities. For example, the computers 500, 502 of the different entities may include database servers of the different entities; workstation computers of the different entities; a workstation computer of a sending entity and a database server of a receiving entity; a database server of a sending entity and a workstation computer of a receiving entity; and/or any other combination of computers associated with the different entities.

At block 600 a graph 102 is displayed in a computer graphical user interface 100. The graph 102 may include at least one node 104 and at least one edge 106. Each node 104 may represent a data object. Each edge 106 may represent one or more relationships 218, 220 between two data objects.

At block 602, a portion of the graph 102 is identified to be redacted based on one or more redaction criteria 302. The portion of the graph 102 may be redacted prior to or at the same time as when the graph 102 is exported. For example, a portion of the graph 102 may be identified for redaction but remain unredacted until the graph 102 is exported.

At block 604, display of the graph 102 may be updated accordingly. Thus, display of the portion of the graph 102 that was identified at block 602 is removed from the computer graphical user interface 100.

At block 606, it is determined whether any redaction criteria remain to be applied. If so, block 606 proceeds to block 602 for another redaction stage 300. Otherwise, block 606 proceeds to block 608.

At block 608, a request to export the graph 102 is received as input by the computer graphical user interface 100. A set of export data including a machine-readable representation of redacted graph 504 may be saved to a file for export.

At optional block 610, audit data is generated and provided to a person authorized to approve exporting of the set of export data including the machine-readable representation of redacted graph 504. The request to export the graph 102 may cause the audit data to be generated.

At block 612, the set of export data including the machine-readable representation of redacted graph 504 is exported to a receiving entity. The receiving entity may then import the set of export data.

Approach for Importing a Redacted Graph

In an embodiment, regardless of whether the receiving entity already has certain data, the receiving entity may import the redacted graph in its entirety. By doing so, the receiving entity may collect rich data about provenance 308. This can be useful for version control. However, data object resolution and/or data deconfliction may be necessary to simplify the visualization of the data.

Data object resolution may involve a user or an automated computing process determining that two or more separate data objects actually represent the same thing in the real world and invoking a function so that the separate data objects appear to users as if they were a single data object. For example, matching unique identifiers 508 and/or matching data object properties (e.g., Social Security Numbers, birthdates, addresses) may indicate that two data objects refer to the same real-world object. When two data objects are resolved together, the data object properties and/or relationships of one data object may be copied to the other data object prior to deleting them from the one data object. However, both data objects may be retained to support version control.

In the event of multiple versions of a particular data item, it may become necessary to deconflict the multiple versions. Data deconfliction may involve determining which of the multiple versions is the correct version. Determining the correct version may be based on vector clocks, timestamps, and/or any other mechanism for attributing a time of creation to a particular version. A time of creation for a version of a data item may correspond to a time (e.g., a logical time) when a change to the data item was persisted. Comparing a respective time of creation for each version of a data item may cause determining that the multiple versions are ordered or concurrent.

In response to determining that the multiple versions are ordered, the version corresponding to the most recent time of creation may be determined to be the correct version. For example, a sending entity may have a version of distinct data object 200 with a time of creation T1, and a receiving entity may have a version of distinct data object 200 with a time of creation T2. Based on comparing T1 and T2, it may be determined that the receiving entity already has the correct version.

In response to determining that the multiple versions are concurrent, the multiple versions may be compared to determine whether each version involves a change to an overlapping data object property or an overlapping data object property type. For example, a sending entity may have a version of distinct data object 202 with a data object property 214 of "blue eyes", and the receiving entity may have a version of distinct data object 202 with a data object property 214 of "brown hair". Since the two versions involve changes to non-overlapping data object property types, the receiving entity may incorporate "blue eyes" into its version of distinct data object 202. In another example, the receiving entity may instead have a version of distinct data object 202 with a data object property 214 of "green eyes". Since the two versions involve changes to overlapping data object property types, the changes may be determined to be conflicting changes.

Conflicting changes may involve manual deconfliction to determine the correct version. To assist a user in manual deconfliction, a most recent common version of a particular data item may be presented to the user along with differences between the most recent common version and each version to be deconflicted. The most recent common version may be a superseded version that was most recently shared by a sending entity and a receiving entity prior to the current divergence in versions. For example, computer 502 at a receiving entity may present an analyst with a superseded version of distinct data object 202 with a data object property 214 of "hazel eyes". Since both the sending entity and the receiving entity had previously agreed that "hazel eyes" was the correct eye color, "green eyes" may be determined to be the correct version of the data object property 214.

In an embodiment, even after deconfliction, the receiving entity may maintain copies of conflicting changes to enrich its provenance data. For example, the receiving entity may associate distinct data object 202 with each of the conflicting data object properties 214. However, "blue eyes" may have a provenance identifier of "1", "green eyes" may have a provenance identifier of "2", and "hazel eyes" may have a provenance identifier of "1" and "2".

Upon importing the redacted graph 400, access control classifications 306 may be assigned at the receiving entity via the computer graphical user interface 100. In an embodiment, the access control classifications 306 assigned at the receiving entity may be based on the access control classifications 306 used by the sending entity. In an embodiment, the access control classifications 306 used by the sending entity may be redacted upon export, so the receiving entity may customize an assignment of access control classifications 306 to the redacted graph 400.

Example Export Computer Graphical User Interfaces

FIGS. 8A-H depict example computer graphical user interfaces for an export process. Although the export process depicted in FIGS. 8A-H is similar to the export process described above, export processes are not limited in any way to the export process described above or depicted in the figures.

Figure 8A:
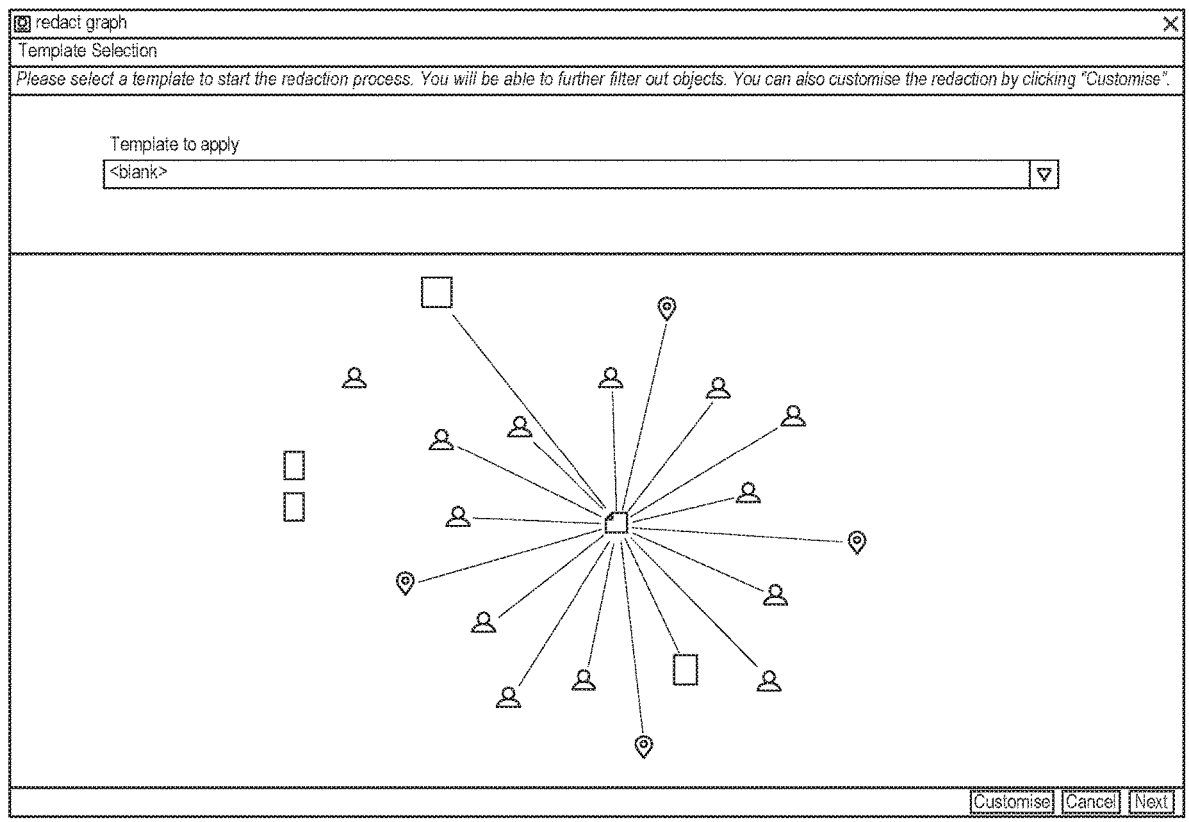
FIGS. 8A-H depict example computer graphical user interfaces for an export process.

FIG. 8A depicts an example computer graphical user interface 100 for selecting a redaction template. A list of redaction templates may be presented in a drop-down menu. Each redaction template may specify one or more redaction stages 300 and one or more redaction criteria 302. A graph 102 to be redacted may also be displayed in a computer graphical user interface 100. Different templates may be suitable for different graphs 102. However, redaction may not be limited to a redaction template that is selected. Further filtering may be specified in addition to any filtering performed based on a redaction template. Additionally or alternatively, a "Customize" button may be selected to modify a redaction template. A "Next" button may be selected to proceed to FIG. 8B.

Figure 8B:
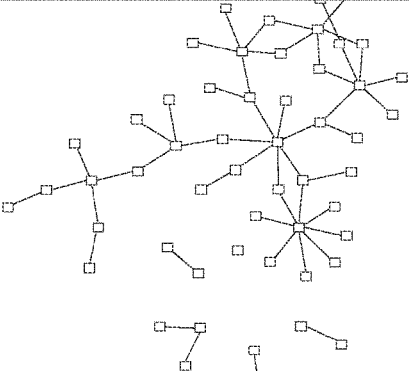

FIG. 8B depicts an example computer graphical user interface 100 for selecting access control classifications 306. In an embodiment, access control classifications 306 may be selected for inclusion. In an embodiment, access control classifications 306 may be selected for exclusion. A computer graphical user interface 100 may display a graph 102 that has been updated to remove portions of the graph 102 that have been identified based on the access control classifications 306. In an embodiment (not shown), the computer graphical user interface 100 may indicate which portions of the graph 102 have been updated. A "Hide Changes" button (not shown) may remove any indications of which portions of the graph 102 have been updated. A "Previous" button (not shown) may be selected to return to FIG. 8A. A "Next" button may be selected to proceed to FIG. 8C.

Figure 8C:
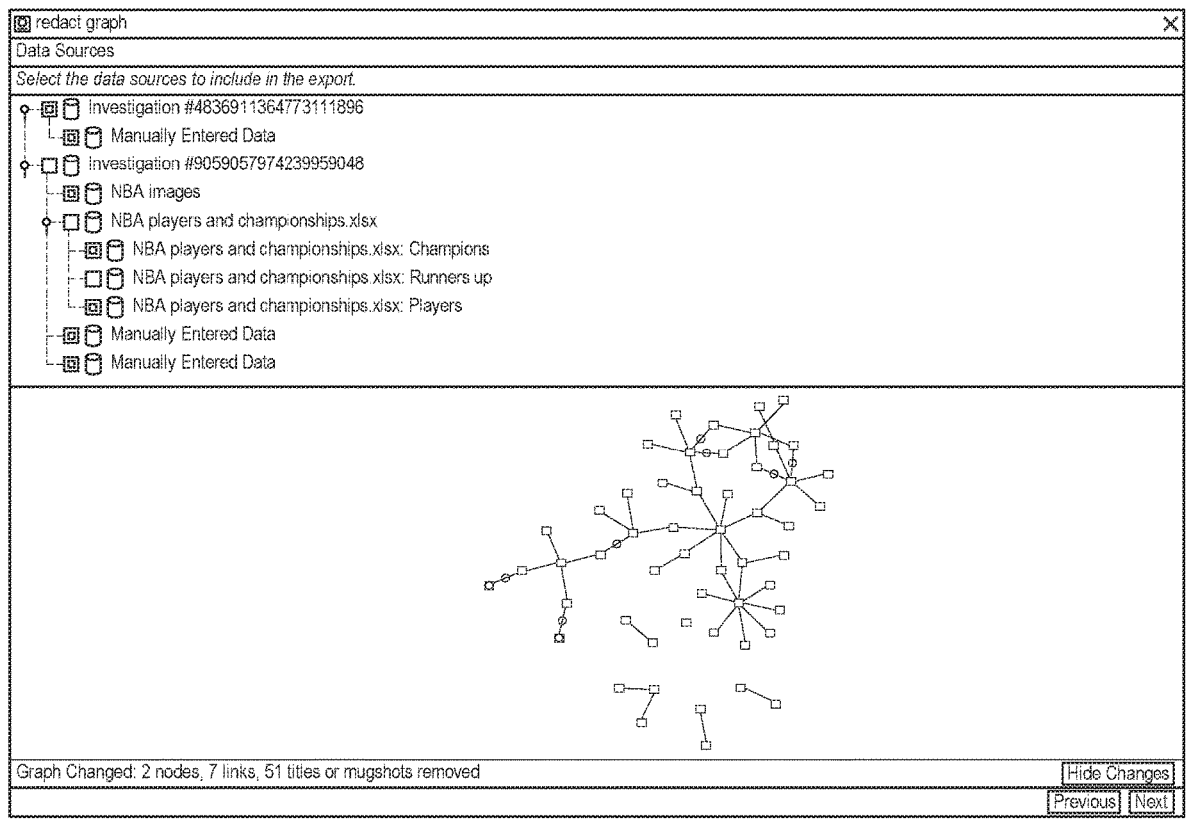

FIG. 8C depicts an example computer graphical user interface 100 for redacting based on provenance 308. In FIG. 8C, data sources and the contents of the data sources are displayed as a hierarchy of checkboxes that list categories, such as particular uploads of data, and sub-categories, such as "Manually Entered Data" and "NBA images". A computer graphical user interface 100 may display a graph 102 that has been updated to remove portions of the graph 102 that have been identified based on provenance 308. The computer graphical user interface 100 may indicate which portions of the graph 102 have been updated. A "Hide Changes" button may remove any indications of which portions of the graph 102 have been updated. A "Previous" button may be selected to return to FIG. 8B. A "Next" button may be selected to proceed to FIG. 8D.

Figure 8D:
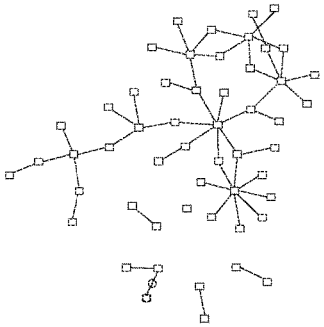

FIG. 8D depicts an example computer graphical user interface 100 for redacting based on data object type 310. In FIG. 8D, data object types 310 are displayed as a hierarchy of checkboxes that list categories, such as "Entity Types", "Document Types", and "Event Types", along with a respective number of sub-categories within each category. Each sub-category, such as "Person", "Commercial Organization", and "Computer", is also displayed with a respective number of data objects within each sub-category. A computer graphical user interface 100 may display a graph 102 that has been updated to remove portions of the graph 102 that have been identified based on data object type 310. The computer graphical user interface 100 may indicate which portions of the graph 102 have been updated. A "Hide Changes" button may remove any indications of which portions of the graph 102 have been updated. A "Previous" button may be selected to return to FIG. 8C. A "Next" button may be selected to proceed to FIG. 8E.

Figure 8E:
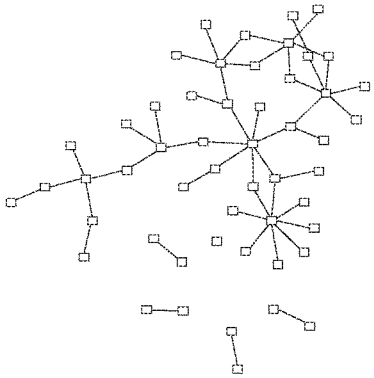

FIG. 8E depicts an example computer graphical user interface 100 for redacting based on data object property type 312. In FIG. 8E, a computer graphical user interface 100 displays a list of checkboxes associated with data object property types 312, such as "Address", "Document Title", and "Item Name". Each data object property type 312 is also displayed with an associated number of data objects and data object properties. The computer graphical user interface 100 may display a graph 102 that has been updated to remove portions of the graph 102 that have been identified based on data object property type 312. The computer graphical user interface 100 may indicate which portions of the graph 102 have been updated. A "Hide Changes" button may remove any indications of which portions of the graph 102 have been updated. A "Previous" button may be selected to return to FIG. 8D. A "Next" button may be selected to proceed to FIG. 8F.

Figure 8F:
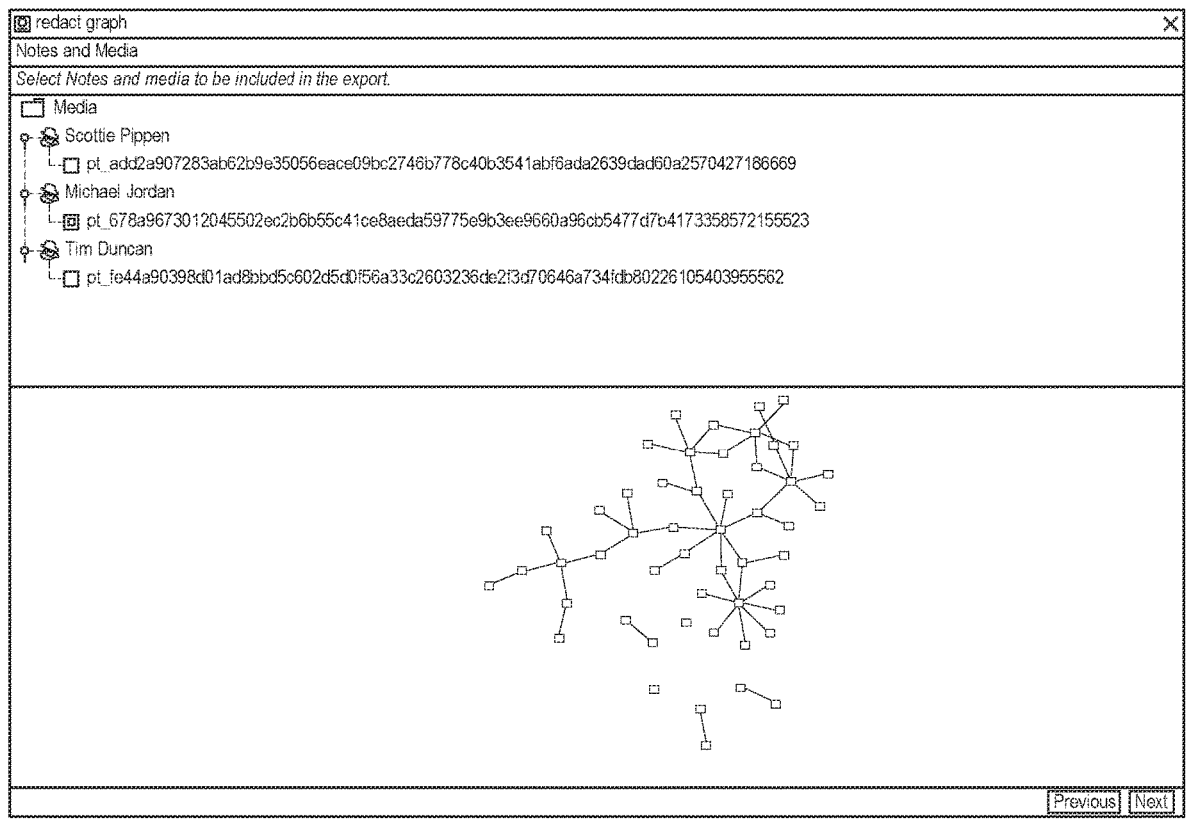

FIG. 8F depicts an example computer graphical user interface 100 for redacting based on notes and media items. In FIG. 8F, a list of data objects are displayed in computer graphical user interface 100. For each data object that is listed, a checkbox corresponding to a media item is displayed. The computer graphical user interface 100 may display a graph 102 that has been updated to remove portions of the graph 102 that have been identified based on notes and media items. For example, only certain data object properties may be removed from a data object if the data object has any remaining data fit for export; otherwise, the entire data object may be removed. In an embodiment (not shown), the computer graphical user interface 100 may indicate which portions of the graph 102 have been updated. A "Hide Changes" button (not shown) may remove any indications of which portions of the graph 102 have been updated. A "Previous" button may be selected to return to FIG. 8E. A "Next" button may be selected to proceed to FIG. 8G.

Figure 8G:
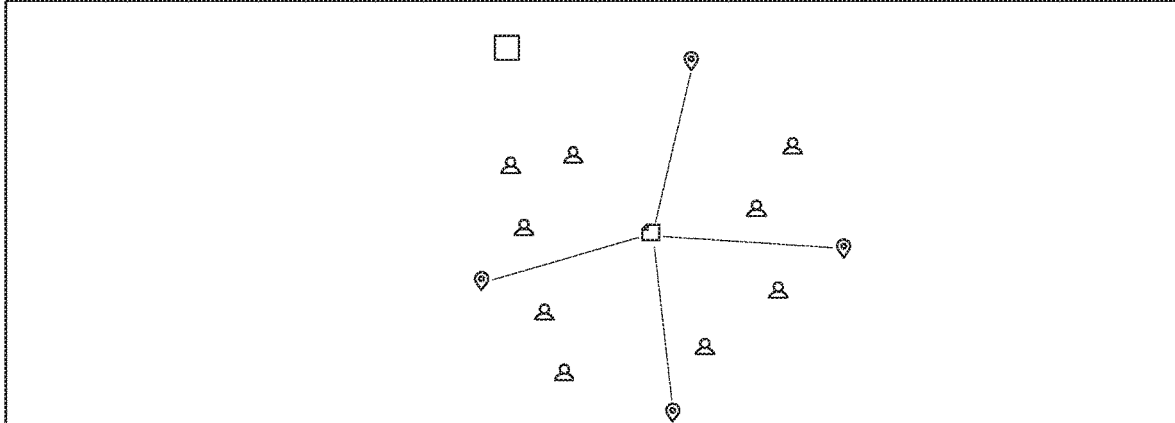

FIG. 8G depicts an example computer graphical user interface 100 for creating export data. The export data may be persisted to a database of the sending entity. There, the export data may be retrieved by an interested party, such as a person authorized to approve exporting a redacted graph 400. Among the details to be persisted with the export data is an explanation of why the export data was generated. A "Previous" button may be selected to return to FIG. 8F. A "Next" button may be selected to proceed to FIG. 8H.

Figure 8H:
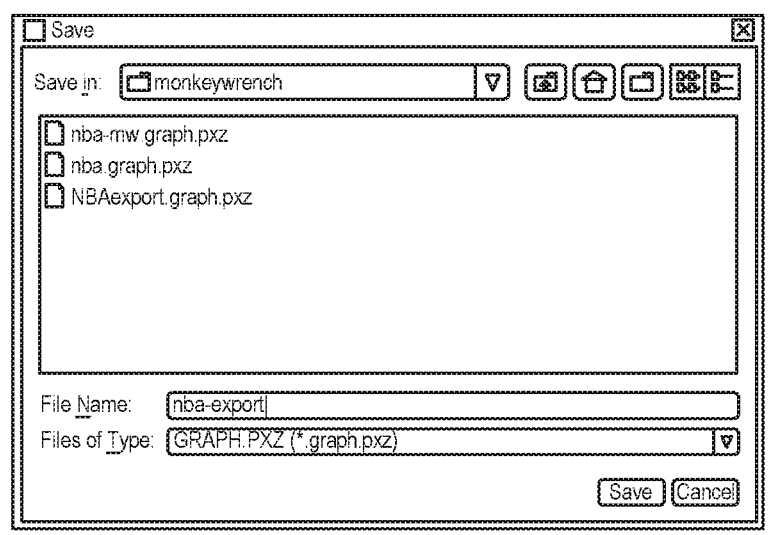

FIG. 8H depicts an example computer graphical user interface 100 for persisting export data as a file. The file format may be a compressed folder that includes a machine-readable representation of a redacted graph 400.

Example Import Graphical User Interfaces

FIGS. 9A-G depict example computer graphical user interfaces for an import process. The import process depicted in FIGS. 9A-G is provided by way of example and does not limit, import processes in any way to the import process depicted in the figures.

Figure 9A:
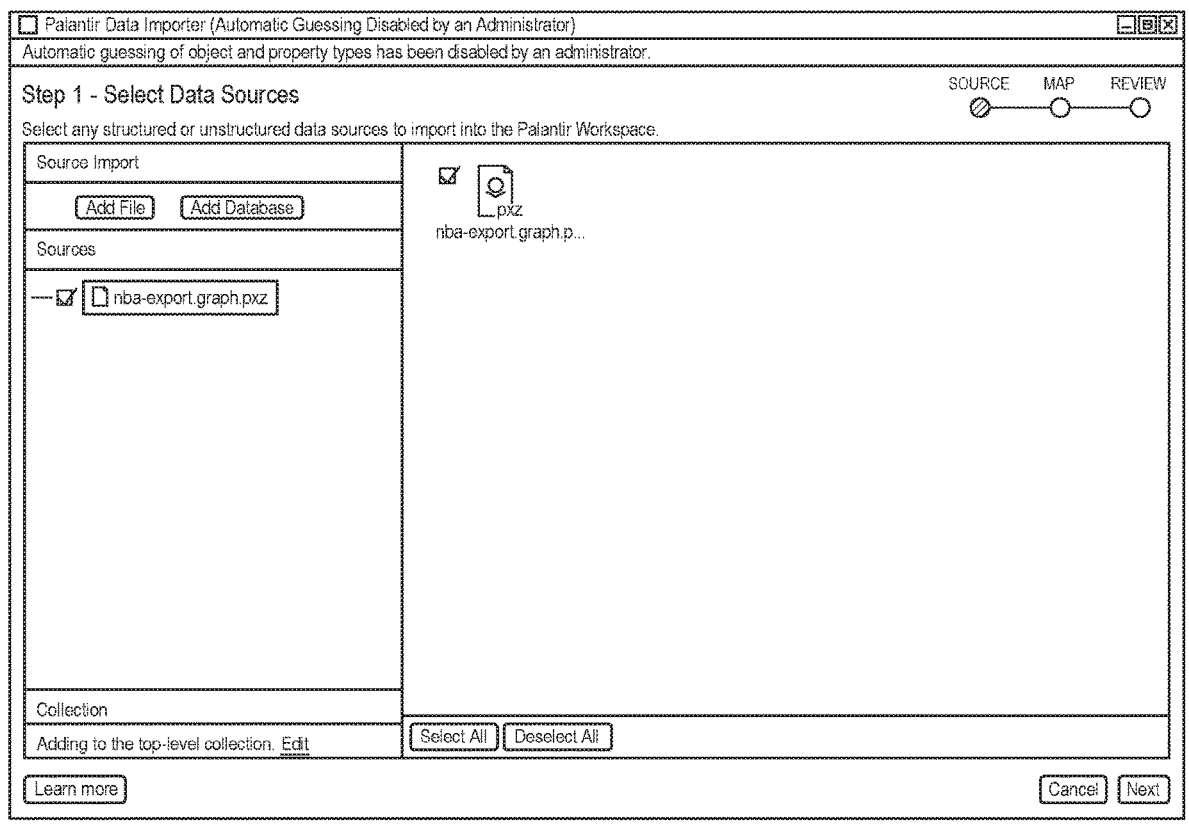

FIG. 9A depicts an example computer graphical user interface 100 for selecting a file to be imported. Files to be imported may be structured or unstructured. In an embodiment, computer graphical user interface 100 may include a feature that displays data object types 310 and/or data object property types 312 automatically detected in the file to be imported. However, this feature may be disabled on command. A "Next" button may be selected to proceed with the import process.

Although not shown, data in a selected file may be mapped according to a data ontology of the receiving entity. For example, graph 102 of FIG. 1 may be transformed into a different representation based on the predefined relationships that are available for the receiving entity.

FIG. 9B depicts an example computer graphical user interface 100 for reviewing import settings. The import settings may include summary statistics (e.g., data size, number of data sources) for the file to be imported, access control classifications 306 to be assigned to data items in the file, rules for data object resolution, and/or rules for data deconfliction (not shown). The import settings may be configured in any number of ways, including manual and/or automatic modes. An "Import" button may be selected to confirm the import settings.

Figure 9C:
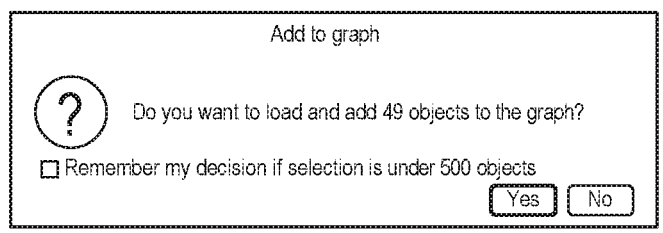

FIG. 9C depicts an example computer graphical user interface 100 for confirming data items for import. In response to selecting the "Import" button depicted in FIG. 9B, an alert message may prompt a user to confirm a particular number of data items for import. The particular number of data items may be determined based on data object resolution and/or data deconfliction.

Figure 9D:

FIG. 9D depicts an example computer graphical user interface 100 for displaying data items confirmed for import. The data items may include data objects, relationships, and data object properties. The data items may be retrieved from an XML file, for example.

Figure 9E:
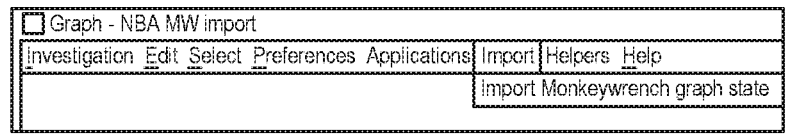

FIG. 9E depicts an example computer graphical user interface 100 for importing graph state information. The graph state information may be necessary to reconstruct a redacted graph 400 from the data items.

Figure 9F:
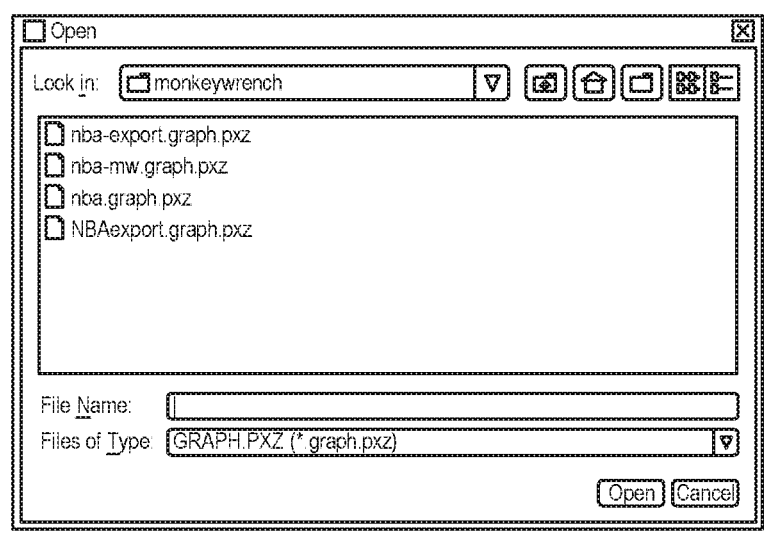

FIG. 9F depicts an example computer graphical user interface 100 for specifying graph state information for import. The graph state information may be retrieved from a compressed folder used to store the graph state information during data transmission.

Figure 9G:
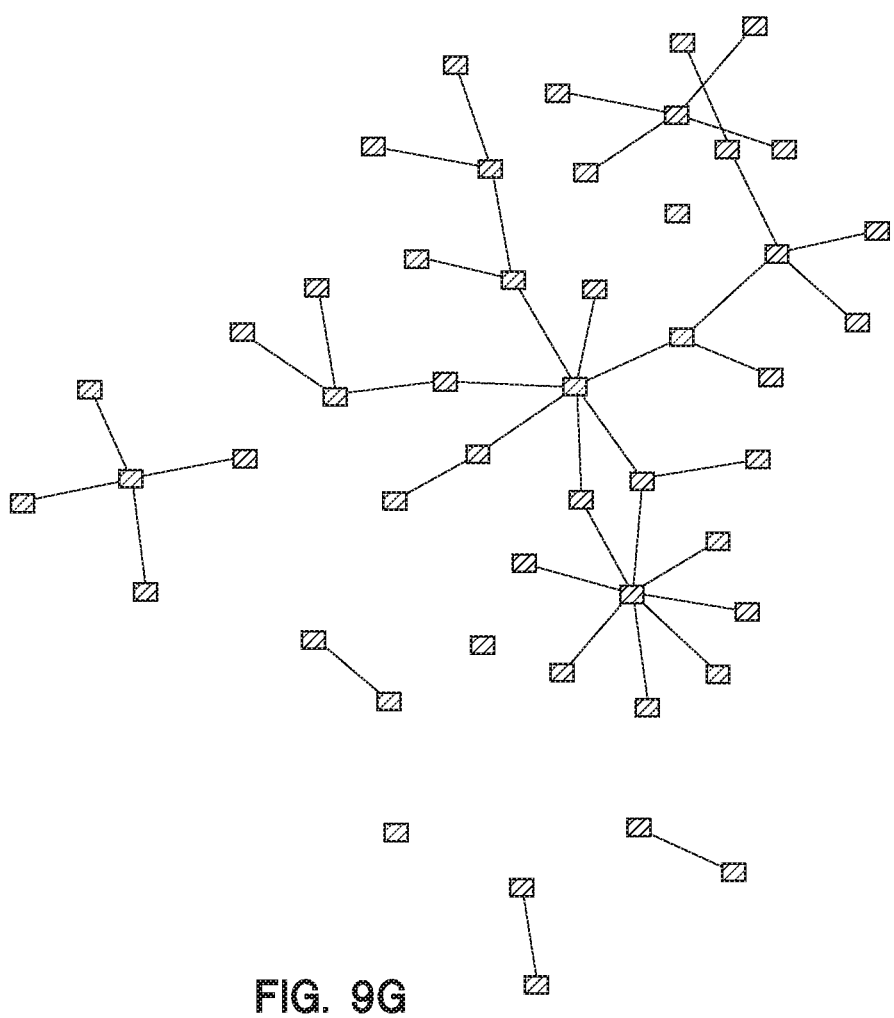

FIG. 9G depicts an example computer graphical user interface 100 for displaying a redacted graph 400. The redacted graph 400 may be reconstructed based on the data items stored in an XML file, for example, and the graph state information.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
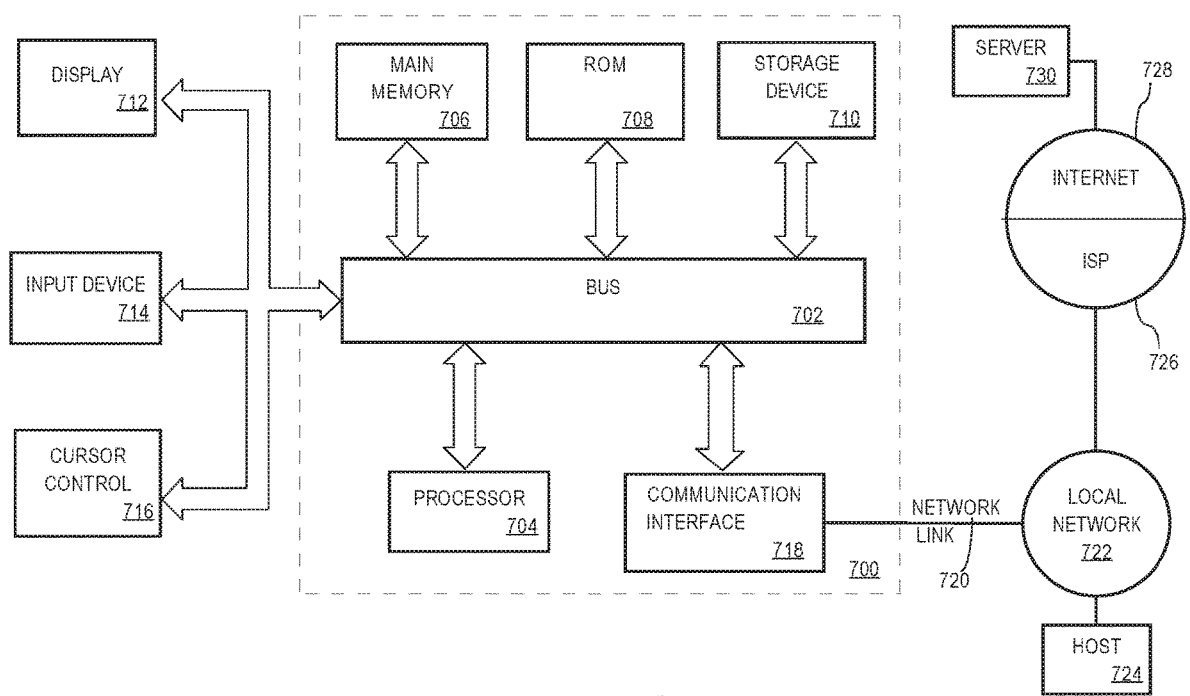
FIG. 7 depicts a computer system upon which an embodiment may be implemented.

For example, FIG. 7 is a block diagram that depicts a computer system 700 upon which an embodiment may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:

displaying, in a computer graphical user interface of a computing device, a graph comprising nodes and edges, each of the edges connecting two of the nodes, each of the nodes representing a distinct data object, each edge representing one or more relationships between two distinct data objects;

automatically detecting redaction criteria based on metadata of the graph, the automatically detected redaction criteria comprising: an access control classification, a provenance identifier, a data object type, and a data object property type;

receiving, via the graphical user interface, a selection of a redaction template of a plurality of redaction templates, the redaction template specifying at least four redaction stages and at least four redaction criteria from the automatically detected redaction criteria;

identifying a portion of the graph to be redacted before a redacted graph is exported, the portion comprising nodes of the graph and edges of the graph, the redacted graph comprising nodes and edges of the graph exclusive of the portion to be redacted;

determining that the portion of the graph to be redacted is identified in a series of the at least four redaction stages based on the redaction template, wherein at each redaction stage, of the series of at least four redaction stages, one or more respective nodes or one or more respective edges of the graph are identified for inclusion in the portion of the graph to be redacted according to a different redaction criterion of the at least four redaction criteria; and exporting a machine-readable representation of the redacted graph; and wherein the method is performed by one or more computing devices.

2. The method of claim 1, wherein identifying a portion of the graph to be redacted and updating display of the graph in a computer graphical user interface to remove display of a redacted portion of the graph are performed in each redaction stage of the series of at least four redaction stages.

3. The method of claim 1, wherein the machine-readable representation is exported with an ontology map of the redacted graph.

4. The method of claim 1, wherein the machine-readable representation comprises a respective unique identifier for each distinct data object in the redacted graph.

5. The method of claim 1, wherein the exporting a machine-readable representation of the redacted graph that comprises the graph exclusive of the portion of the graph includes generating and providing audit data to a person authorized to approve the exporting of the machine-readable representation.

6. A computer system comprising:
one or more processors; and
one or more computer-readable media storing instructions which, when executed by the one or more processors, cause:
displaying, in a computer graphical user interface of a computing device, a graph comprising nodes and edges, each of the edges connecting two of the nodes, each of the nodes representing a distinct data object, each edge representing one or more relationships between two distinct data objects;
automatically detecting redaction criteria based on metadata of the graph, the automatically detected redaction criteria comprising: an access control classification, a provenance identifier, a data object type, and a data object property type;
receiving, via the graphical user interface, different user-selected redaction criteria from the automatically detected redaction criteria;
identifying a portion of the graph to be redacted before a redacted graph is exported, the portion comprising nodes of the graph and edges of the graph, the redacted graph comprising nodes and edges of the graph exclusive of the portion to be redacted;
determining that the portion of the graph to be redacted is identified in a series of at least four redaction stages;
wherein at each redaction stage, of the series of at least four redaction stages, one or more respective nodes or one or more respective edges of the graph are identified for inclusion in the portion of the graph to be redacted according to a different user-selected redaction criterion of the different user-selected redaction criteria; and
exporting a machine-readable representation of the redacted graph.

7. The system of claim 6, wherein identifying a portion of the graph to be redacted and updating display of the graph in a computer graphical user interface to remove display of a redacted portion of the graph are performed in each redaction stage of the series of at least four redaction stages.

8. The system of claim 6, wherein the machine-readable representation is exported with an ontology map of the redacted graph.

9. The system of claim 6, wherein the machine-readable representation comprises a respective unique identifier for each distinct data object in the redacted graph.

10. The system of claim 6, wherein the exporting a machine-readable representation of the redacted graph that comprises the graph exclusive of the portion of the graph includes generating and providing audit data to a person authorized to approve the exporting of the machine-readable representation.

11. A non-transitory storage media storing instructions which, when executed by a processor, cause:
displaying, in a computer graphical user interface of a computing device, a graph comprising nodes and edges, each of the edges connecting two of the nodes, each of the nodes representing a distinct data object, each edge representing one or more relationships between two distinct data objects;
automatically detecting redaction criteria based on metadata of the graph, the automatically detected redaction criteria comprising: an access control classification, a provenance identifier, a data object type, and a data object property type;
receiving, via the graphical user interface, different user-selected redaction criteria from the automatically detected redaction criteria;
identifying a portion of the graph to be redacted before a redacted graph is exported, the portion comprising nodes of the graph and edges of the graph, the redacted graph comprising nodes and edges of the graph exclusive of the portion to be redacted;
determining that the portion of the graph to be redacted is identified in a series of at least four redaction stages;
wherein at each redaction stage, of the series of at least four redaction stages, one or more respective nodes or one or more respective edges of the graph are identified for inclusion in the portion of the graph to be redacted according to a different user-selected redaction criterion of the different user-selected redaction criteria; and
exporting a machine-readable representation of the redacted graph.

12. The non-transitory storage media of claim 11, wherein identifying a portion of the graph to be redacted and updating display of the graph in a computer graphical user interface to remove display of a redacted portion of the graph are performed in each redaction stage of the series of at least four redaction stages.

13. The non-transitory storage media of claim 11, wherein the machine-readable representation is exported with an ontology map of the redacted graph.

14. The non-transitory storage media of claim 11, wherein the machine-readable representation comprises a respective unique identifier for each distinct data object in the redacted graph.

15. The non-transitory storage media of claim 11, wherein the exporting a machine-readable representation of the redacted graph that comprises the graph exclusive of the portion of the graph includes generating and providing audit data to a person authorized to approve the exporting of the machine-readable representation.

* * * * *